United States Patent [19]

Hattori et al.

[11] 4,433,965

[45] Feb. 28, 1984

[54] TORQUE TRANSMISSION BELT MEANS

[75] Inventors: Yoshiyuki Hattori, Toyoake; Kazuma Matsui, Toyohashi; Hiroji Kinbara, Aichi, all of Japan

[73] Assignee: Nippondenso Co., Ltd., Kariya, Japan

[21] Appl. No.: 237,261

[22] Filed: Feb. 23, 1981

[30] Foreign Application Priority Data

Feb. 25, 1980 [JP] Japan ................................. 55-23015

[51] Int. Cl.³ ......................... F16G 1/00; F16G 1/20
[52] U.S. Cl. ..................................... 474/201; 474/272
[58] Field of Search ............... 474/201, 240, 242, 244, 474/245, 272

[56] References Cited

U.S. PATENT DOCUMENTS

| | | | |
|---|---|---|---|
| 720,340 | 2/1903 | Fouillaron | 474/201 |
| 811,794 | 2/1906 | Riddell | 474/201 |
| 962,563 | 6/1910 | Foster et al. | 474/201 |
| 3,720,113 | 3/1973 | Van Doorne et al. | 474/242 |
| 3,949,621 | 4/1976 | Beusink | 474/201 |
| 4,080,841 | 3/1978 | Vollers | 474/201 |
| 4,338,081 | 7/1982 | Hattori | 474/201 |
| 4,342,561 | 8/1982 | Braybrook | 474/242 |

*Primary Examiner*—John E. Murtagh
*Assistant Examiner*—Andrew Joseph Rudy
*Attorney, Agent, or Firm*—Cushman, Darby & Cushman

[57] ABSTRACT

A torque transmission belt means comprises a ring having excellent bending and tensile strength which is extended around pulleys positioned in the driving side and the driven side and a series of blocks composed of main blocks made of non-compressive material having high strength and secondary blocks made of elastic material, which are alternately arranged along the ring so as to be shiftably engaged therewith.

10 Claims, 11 Drawing Figures

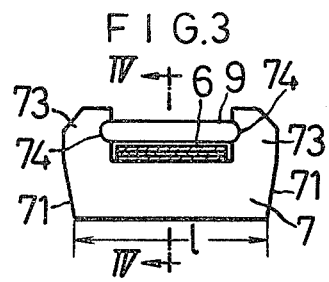
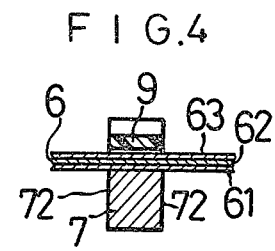
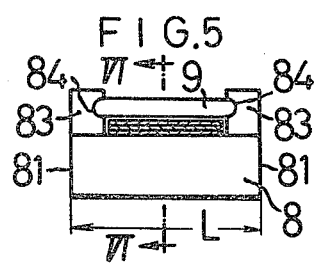
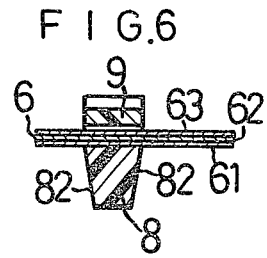
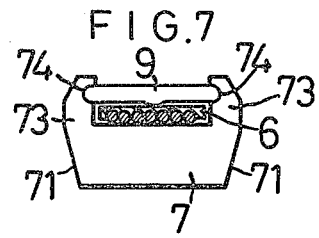
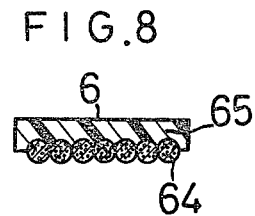
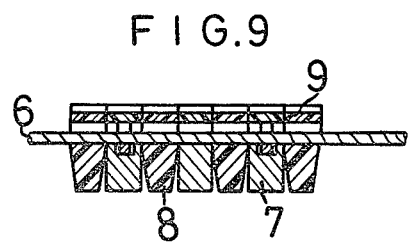
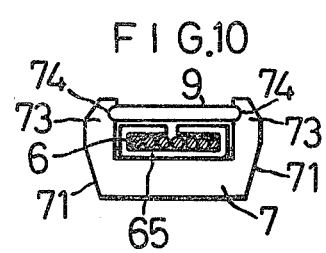
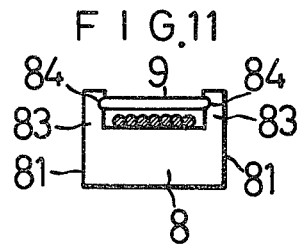

TORQUE TRANSMISSION BELT MEANS

BACKGROUND OF THE PRESENT INVENTION

The present invention relates to a torque transmission belt means which is extended around a pulley positioned in the driving side and a pulley positioned in the driven side for transmitting a driving force from the pulley in the driving side to the pulley in the driven side.

Conventionally, one of such a torque transmission belt means comprises a plurality of ring-shaped metallic strips which are piled up each other and a series of metallic blocks which are shiftably engaged with the metallic strips (U.S. Pat. No. 3,720,113).

And we inventors have proposed a unique torque transmission belt means (U.S. Pat. No. 4,338,081). According to this torque transmission belt means, main blocks made of material having high strength such as metal and secondary blocks made of non-metallic material having excellent compression resistance such as carbon graphite and synthetic resin are alternately mounted on a ring composed of metal strips in order to decrease the noise generated when the belt means is operated.

One object of the present invention is to provide a torque transmission belt means which operates more silently compared with the above described conventional torque transmission belt means.

Another object of the present invention is to provide a torque transmission belt means provided with a ring of which curvature is changeable over a wide range according as each diameter of pulleys positioned on both sides.

DESCRIPTION OF THE DRAWINGS

Other objects and advantages of the invention will become aparent from the following description of embodiments with reference to the accompanying drawings wherein:

FIG. 3 is a front view of a main block of FIG. 1;

FIG. 4 is a sectional view of the main block taken along the line IV—IV of FIG. 3;

FIG. 5 is a front view of a secondary block of FIG. 1;

FIG. 6 is a sectional view of the secondary block taken along the line VI—VI of FIG. 5;

FIG. 7 is a front view of a main block of a second embodiment of the present invention;

FIG. 8 is an enlarged view of a ring of FIG. 7;

FIG. 9 is a fragmentary sectioned view of a third embodiment of the present invention;

FIG. 10 is a front view of a main block of FIG. 9; and

FIG. 11 is a front view of a secondary block of FIG. 9.

SUMMARY OF THE INVENTION

According to the present invention, the above described objects can be obtained by using secondary blocks made of elastic material. And also, the above described objects can be attained by using a ring composed of a metallic wire together with the secondary blocks made of elastic material.

DETAILED DESCRIPTION

Hereinafter, the present invention will be explained in accordance with embodiments with reference to the drawings.

FIGS. 1 to 6 show a first embodiment.

Figure 1:
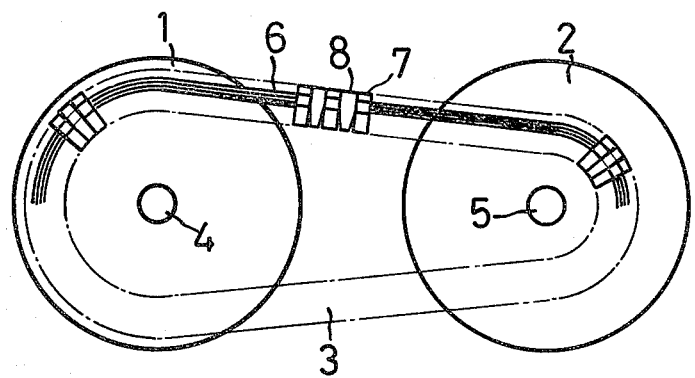
FIG. 1 is a schematic view of a first embodiment of a torque transmission belt means of the present invention.

In FIG. 1, a pulley 1 is positioned in the driving side and connected to a driving shaft 4 of an engine, for example. Thus, the pulley 1 is rotated by the engine. And the rotation of the pulley 1 is transmitted to a pulley 2 positioned in the driven side through a torque transmission belt means 3 so that an operating shaft 5 of an auxiliary machinery such as compressor, an alternator and an air pump is rotated.

The torque transmission belt means 3 is composed of a series of blocks consisting of main blocks 7 and secondary blocks 8 which are alternately arranged with each other and a ring 6 made of metallic material having excellent bending strength and tensile strength. The series of blocks are linked up by the ring 6.

Figure 2:
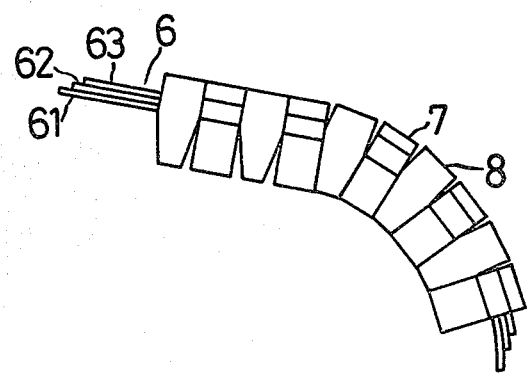
FIG. 2 is an enlarged view of one portion of FIG. 1.

As shown in FIG. 2, the ring 6 is composed of three superimposed metal strips 61, 62 and 63 in order to improve the tensile strength of the ring 6.

The main block 7 is made of non-compressive material such as steel, carbon graphite fibers bound by synthetic resin and non-compressive and reinforced synthetic resin using carbon graphite fibers as filler.

The both sides 71 and 71 of the main block 7 are formed into inclined surfaces so as to be contacted with each V-shaped groove (not shown) of the pulleys 1 and 2 as shown in FIG. 2 and FIG. 3. And remaining sides 72 and 72 facing to the moving direction of the belt means of the main block 7 are formed parallel with each other.

In each upper portion of both sides 71 and 71 of the main block 7, a projecting portion 73 is formed. Between the projecting portions 73 and 73, a ring 6 is shiftably inserted. In grooves 74 and 74 which are formed in the inner surfaces of the projecting portions 73 and 73, a plate 9 is fit.

The secondary block 8 is made of elastic material such as rubber and resin. For example, polyimide, polyacetal, phenol, polybutylene terephthalate or nylon is used as the resin.

The preferable range of compressive elastic modulus is from 100 kg/mm$^2$ to 2000 kg/mm$^2$.

As shown in FIGS. 5 and 6, opposed sides 81 and 81 of the secondary block 8 are formed parallel with each other and the remaining opposed sides 82 and 82 are formed inclined so that the distance therebetween is reduced toward the inside of the ring 6. The width of the secondary block 8 (the distance L between both sides 81 and 81) is formed slightly shorter than the minimum width of the main block 7.

Therefore, the secondary block 8 is not contacted with the V shaped grooves of the pulleys 1 and 2.

The torque transmission belt means 3 having the above described construction is extended between the pulley 1 in the driving side and the pulley 2 in th driven side.

The rotation of the pulley 1 in the driving side is transmitted to the pulley 2 in the driven side through the main blocks 7, the secondary blocks 8 and the ring 6.

By forming the main blocks 7 and the secondary blocks 8 as described above, the torque transmission belt means of the present invention has following operation effects.

(1) Since the secondary blocks 8 are made of elastic material, noise is scarcely generated when the metallic main blocks 7 and the secondary blocks 8 are contacted with each other during the rotation of the torque transmission belt means.

(2) Since the secondary blocks 8 are made of elastic material, the torque transmission belt means of the first embodiment can be easily curved according as the curvature of the pulleys 1 and 2.

Therefore, the torque transmission belt means of the first embodiment can be effectively applied to the pulleys of which curvature is largely different from each other or is changeable.

(3) Since the secondary block 8 made of elastic material is interposed between the main blocks 7, bending stress of the ring 6 is not locally concentrated to the metal blocks 7 and 8.

(4) The secondary blocks 8 can be easily produced by moulding the rubber or resin.

(5) The weight of the torque transmission belt means of the first embodiment is made smaller than that of which all blocks are made of metal. Therefore, the torque transmission belt means can be effectively applied to the pulleys which rotate at high speed.

FIGS. 7 and 8 show the second embodiment of the present invention.

The ring 6 is composed of a ring-shaped wire bundle 64 which is formed by winding one twisted metallic wire several times so that each line of wire is parallel with other line of wire, and an elastic member 65 which integrally joins the wire bundle in parallel relation. The elastic member 65 is made of material such as polyurethane and rubber and is moulded in the outer periphery of the ring-shaped wire member. Other construction of the torque transmission belt means is substantially equal to that of the first embodiment.

The torque transmission belt means of the second embodiment has similar effect to that of the first embodiment.

Furthermore, the torque transmission belt means of this embodiment can be produced more easily than that which is produced by piling up a plurality of metal strips. And the torque transmission belt means of the second embodiment scarcely generates noise.

Namely, according to the torque transmission belt means wherein a plurality of metal strips are piled up, it is very difficult to pile up the metal strips so as to be uniformly contacted with one another. Slacks are locally excessive pushing force are easy to be generated between the adjacent metal strips. Therefore, when these metal strips are relatively moved during the rotation of the belt means, noise is generated.

In contract, in the above described torque transmission belt means using the wire bundle, noise is not generated.

FIGS. 9, 10 and 11 show the third embodiment of the present invention. The wire bundle 64 similar to the above described second embodiment is joined by a plurality of clips 65. The clips 65 are made of synthetic resin, or the like and are accomodated within the main blocks 7 so as to be slidable with the wire bundle 64. Other construction of the torque transmission belt means of the third embodiment is substantially equal to that of the first embodiment. And the torque transmission belt means of the third embodiment has similar effect to that of the first embodiment.

Furthermore, the torque transmission belt means of the third embodiment can be also produced more easily than that provided with metal strips and scarcely generates noise.

In the embodiments of the present invention, the opposed side surfaces of the main blocks are formed in parallel with each other.

According to the present invention, the opposed surfaces of the main blocks, which face the secondary blocks can be formed inclined toward the inside of the ring like the secondary blocks.

Furthermore, in the embodiments of the present invention, the width of the secondary blocks is made shorter than that of the main blocks.

According to the present invention, the secondary blocks can be formed into the same size and shape as the main blocks.

Having now fully described the invention, it will be apparent to one of ordinary skill in the art that many changes and modifications can be made thereto without departing from the spirit or scope of the invention as set forth herein.

What is claimed is:

1. A torque transmission belt extending between a drive pulley and a driven pulley and movable for transmitting a driving force from said drive pulley to said driven pulley, comprising:

a ring extending around said pulleys; and a series of blocks arranged along said ring and shiftably engaged therewith, said series of blocks being composed of two kinds of blocks alternately arranged along said ring:

one kind of blocks being made of non-compressive material having high strength and being provided with opposed side surfaces which contact said pulleys as the belt moves; and the other kind of blocks being made of elastic material formed so that the distance between opposed side surfaces facing said one kind of blocks is decreased toward the inside of said ring.

2. A torque transmission belt means according to claim 1, wherein:

said one kind of blocks are made of material selected from the group consisting of metal, carbon graphite fibers bound by synthetic resin and synthetic resin including carbon graphite fibers as filler.

3. A torque transmission belt means according to claim 1, wherein:

said the other kind of blocks are made of rubber.

4. A torque transmission belt means according to claim 1, wherein:

said the other kind of blocks are made of synthetic resin selected from the group consisting of polyimide, polyacetal phenol, polybuthylene terephtalate and nylon.

5. A torque transmission belt means according to claim 1, wherein:

said the other kind of blocks have compressive elastic modulus ranging from 100 kg/mm$^2$ to 2000 kg/mm$^2$.

6. A torque transmission belt means according to claim 1, wherein:

said ring is composed of a predetermined number of metallic strips which are superimposed on one another like layers.

7. A torque transmission belt means according to claim 1, wherein:

said ring is composed of a wire bundle which is formed by winding a twisted metallic wire several times like a ring so that each line of wire is parallel with other lines, and an elastic member which integrally joins said wire bundle in parallel relation.

8. A torque transmission belt means according to claim 7, wherein:
   said elastic member is made of rubber or resin and is joined to said wire bundle by moulding.

9. A torque transmission belt means according to claim 1, wherein:
   said ring is composed of a wire bundle which is formed by winding a twisted metallic wire several times like a ring so that each line of wire is parallel with other lines, and a predetermined number of clips which join said wire bundle and which are slidably engaged with said wire bundle.

10. A torque transmission belt means according to claim 9, wherein:
    said clips are accomodated within each of said one kind of blocks.

* * * * *